Jan. 3, 1939.   H. WOLLNER   2,142,432
METHOD OF MAKING UNIVERSAL JOINT YOKES
Filed Jan. 8, 1936
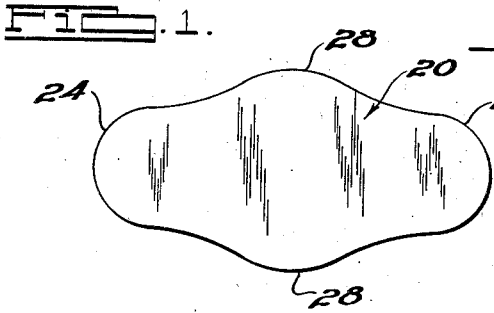
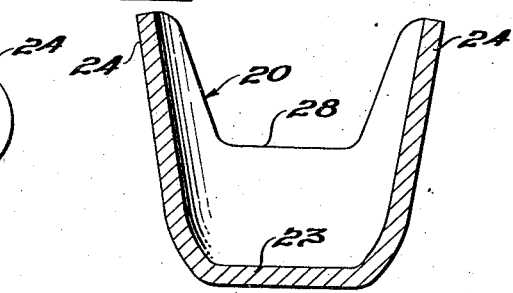
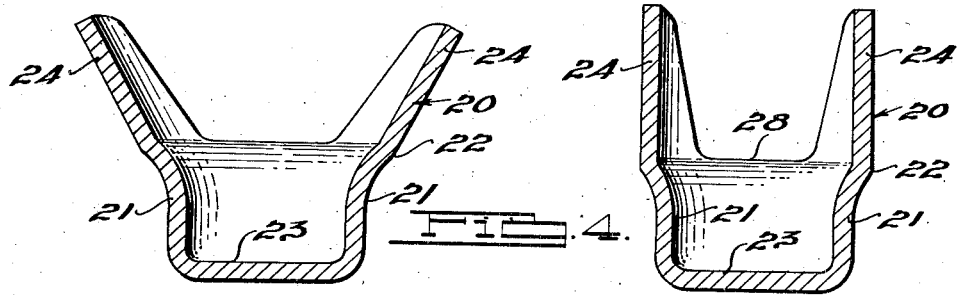
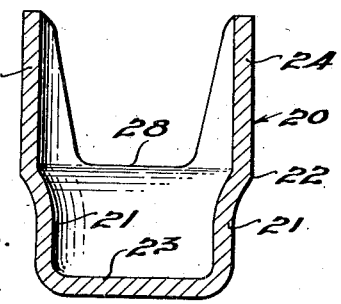
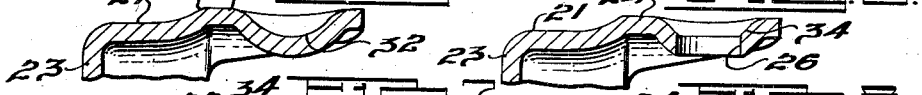
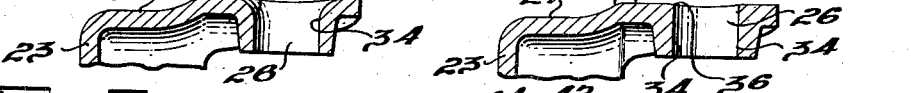
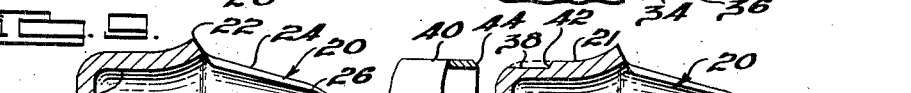
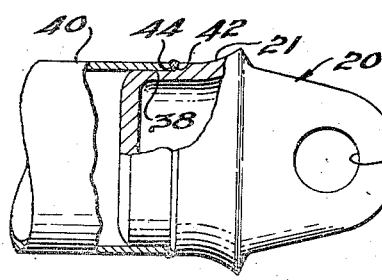
INVENTOR.
Hans Wollner.
BY
Harness, Dickey, Pierce & Hann.
ATTORNEYS.

Patented Jan. 3, 1939

2,142,432

UNITED STATES PATENT OFFICE 2,142,432

METHOD OF MAKING UNIVERSAL JOINT YOKES

Hans Wollner, Detroit, Mich., assignor to Universal Products Company, Inc., a corporation of Delaware Application January 8, 1936, Serial No. 58,024

3 Claims. (Cl. 29—152)

The present invention relates to the manufacture of universal joint mechanism, and in particular, provides an improved one-piece drawn yoke for universal joints and method of making the same.

The principal objects of the present invention are to provide a one-piece drawn yoke for universal joints and the like and method of making the same; to provide a method as just stated, in which a complete yoke for universal joints or the like may be drawn from a single flat blank of metal; to provide a method comprising a plurality of individual steps which permit the drawing to a relatively intricate shape without danger of producing weak spots in the yoke; to provide a method which, using a standard size of blank, permits the drawing of yokes adapted for connection to different sizes of torque tubes or other power transmitting devices; to provide a method of drawing yokes for universal joints or the like in accordance with which only a minimum of final machining and trimming operations is necessary.

With the above and other objects in view, which appear in the following description and in the appended claims, a preferred construction of yoke, illustrative of the product of the improved method of the present invention, is shown in the accompanying drawing, throughout the several views of which corresponding reference characters are used to designate corresponding parts, and in which:

Figure 1 is a plan view of a blank of appropriate shape from which to draw an improved yoke;

Figure 2 is a view in vertical section illustrating the product of the first step of the preferred method;

Figure 3 is a view in vertical section illustrating the product of the second step;

Figure 4 is a view in vertical section illustrating the product of the third step;

Figure 5 is a fragmentary view of one leg of the yoke illustrating a step preliminary to punching an opening in such leg;

Figure 6 is a view corresponding to Figure 5 and illustrating one leg of the yoke after the punching of a journal opening therein;

Figure 7 is a view corresponding in general to Figure 6 and illustrating the product of a further step in the forming of the journal opening in the yoke leg;

Figure 8 is a fragmentary view illustrating the completed journal opening in a yoke leg;

Figure 9 is a view, partly in vertical section, illustrative of the product of the drawing operation;

Figure 10 is a view, partly in vertical section, illustrating the preferred machining, adapting the completely drawn yoke for connection to a torque tube, and Figure 11 is a view, partly in section, of a completed yoke assembled with a torque tube.

Referring to the various views in the drawing, the completed yoke 20 of Fig. 9, and which comprises a cup shaped base or neck having substantially parallel side walls 21, a base 23 and a slightly flared rim 22, and a pair of diametrically opposed similar legs 24 which extend from the rim of the neck and are provided with the journal openings 26, is formed in a succession of individual steps from flat blanks 20, shown in Fig. 1. Preferably, and as illustrated, the blank is formed as shown to minimize final trimming operations, and comprises the rounded ends from which, as later described, the just mentioned legs 24 are formed, and the outwardly flared sides 28. As will be understood, blank 20 may be relatively economically stamped from flat stock.

In accordance with the preferred method, the first forming step consists in drawing the blank 20 to the shape shown in Fig. 2, in which the midsection of the blank 20 constitutes the base 23 of the now cup-shaped blank 20, the flared side portion 28 becomes the side walls of reduced height, and the end sections 24 become the legs or extended side wall portions. This drawing action may be, and preferably is, accomplished by the use of dies which define the flat base portion 23 and a limited portion of the side walls of the cup-shaped blank. The edge portions of the blank not confined between the dies are found to bend up naturally to substantially the positions shown in Fig. 2, as a consequence of the bending action of the dies upon the lower portion of the side walls.

It will be noted that the shape shown in Fig. 2 presents a substantially circular horizontal section at any point from the base to the top thereof. The legs 24, accordingly, as well as the side portions 28, are initially given a bowed shape, which, if not essential, is at least highly desirable in the completed article to enable the yoke to withstand the severe torsional stresses to which it is subjected in service.

Preferably, the second step consists in necking down or reducing the size of the base of the cup-shaped blank of Fig. 2, to bring the side walls 21 of the cup into perpendicular relation with respect to the base 23, and to also define the shoulder or rim 22 between the cup-shaped base and the legs 24. In this step the dies preferably confine only the base of the yoke, including the base 23 and the side walls 21, the legs 24 extending freely of the dies. It has been found in the practice of the present invention that, during this step, the initially bowed or rounded character of the legs 24 is retained, but the legs flare outwardly somewhat to the positions shown in Fig. 3 and the next or third step preferably consists in bending the legs 24 into the parallel relation shown in Fig. 4 in which they are also parallel to the side walls 21 and perpendicular to the base 23.

It will be understood that the extent of reduction in the size of the base or neck, comprising the side walls 21 and base 23, effected during the second step, is variable and depends upon the size of the torque tube or other power transmitting device to which the yoke is ultimately to be connected. A feature of the present method is the simplicity with which blanks of standard size may be utilized to form yokes adapted for connection to torque tubes of different sizes.

The initial three steps of the forming process, as above described, produce a structure having substantially the desired contour and the remaining illustrated steps consist in forming the journal openings 26 within the respective legs 24. Preferably, the various illustrated steps are conducted simultaneously on both legs of each yoke, although Figs. 5 through 8 show only a single leg.

It is preferred in the completed yoke to have each journal opening present a journal surface greater than is represented by the thickness of the metal from which the yoke is drawn. Accordingly, the first step in forming the journal opening may, and preferably does, consist in a preliminary drawing operation which produces a relatively shallow cup 32 of generally circular section in each leg 34. The next step, shown in Fig. 5, consists in piercing an opening 26 in the base of each cup 32, leaving the wall portions 34. The next step, shown in Fig. 7, preferably consists in drawing the walls 34 inwardly so that they are substantially parallel with each other and perpendicular to the outer faces of the legs 24. In this step, the openings 26 are enlarged to substantially the final dimensions thereof, and the walls 34 are also somewhat increased in length. The final step in forming the journal openings 26 is shown in Fig. 7 and consists in upsetting the sleeve or journal defined by the walls 34 to bring such walls into more accurate parallelism and to form the relatively square corners 36 at the intersection between the walls 34 and the outer faces of the legs 24.

The above described steps produce the substantially complete yokes shown in Fig. 9 and the remaining steps consist principally in machining the openings 26 and the inner and outer faces of the side walls 24.

A preferred method of assembling the thus completed yoke with a torque tube or other power transmitting device is shown in Figs. 10 and 11, in which portions of the side walls 21 are cut away providing a section 38 of reduced diameter, corresponding to the inside diameter of the associated tube 40 with which it is to be assembled, and joining the uncut portions of the walls 21 at a sloping shoulder 42. The tube 40 and yoke 20 may then be secured together by welding around the V-shaped seam between the shoulder 42 and the correspondingly tapered end 44 of the tube 40.

The above method of manufacturing the yokes of universal joints from single blanks has been found in practice to very substantially reduce the manufacturing cost of such yokes. The complete yokes, being formed from single pieces, no assembly operations are involved in the manufacture thereof. Proper practice of the method permits the drawing of the yokes from stock of widely varying gauge, to provide different sizes of completed yokes, without introducing weak spots in the articles. The particular forming steps discussed above have been found to economically produce thoroughly satisfactory results. It will be understood, however, that various modifications in the specific construction of the completed yokes, as well as various modifications of the particular method, may be made within the spirit and scope of the present invention.

What I claim is:

1. The method of forming a yoke, adapted to form part of a universal joint, which includes the steps of drawing a single metal stamping to define a neck having a pair of opposed legs extending from the edge thereof in diverging relation and, subsequently, reforming the shape of said neck portion and reducing the angle of divergency between said legs.

2. The method of forming a yoke, adapted to form part of a universal joint, from a single elongated metal stamping, which includes the steps of drawing the mid-section thereof into a cup shaped neck and the end sections into opposed legs extending in diverging relation from the rim of the neck, thereafter restricting the size of said neck, and thereafter reducing the angle of divergency between said legs.

3. The method of forming a yoke, adapted to form part of a universal joint, from a single elongated metal stamping which includes the successive steps of drawing the mid-section of said stamping into a cup-shaped formation with the end sections forming opposed legs extending from the cup rim, restricting said neck section to adapt it for connection to a drive member and bringing said legs into selected angular relationship with each other, and thereafter forming journal openings in said leg sections by combined drawing and punching operations.

HANS WOLLNER.